United States Patent [19]

Trunner et al.

[11] 4,289,039
[45] Sep. 15, 1981

[54] RELEASE MECHANISM FOR A VALVE OF A FIRE EXTINGUISHING INSTALLATION

[75] Inventors: Josef Trunner, Mönchaltorf; Marinus Both, Männedorf, both of Switzerland

[73] Assignee: Cerberus AG, Männedorf, Switzerland

[21] Appl. No.: 26,053

[22] Filed: Apr. 2, 1979

[30] Foreign Application Priority Data

Apr. 10, 1978 [CH] Switzerland ............... 3814/78

[51] Int. Cl.³ ........................................... F16K 31/56
[52] U.S. Cl. ............................... 74/2; 222/402.14; 251/68; 251/66
[58] Field of Search ............. 74/2, 56, 22 A, 57; 251/66, 68, 74, 73, 72, 337, 67, 175, 100; 169/89, 21; 222/402.14, 518; 192/93 A

[56] References Cited

U.S. PATENT DOCUMENTS

| 1,960,973 | 5/1934 | Knight | 74/2 X |
| 2,535,095 | 12/1950 | Schwartz et al. | 74/2 |
| 2,943,496 | 7/1960 | Valentine | 74/56 |
| 3,403,668 | 10/1968 | Schotiler | 74/56 X |
| 3,518,891 | 7/1970 | Denkowski | 74/2 X |
| 3,808,895 | 5/1974 | Fitzwater | 74/2 |
| 4,034,624 | 7/1977 | Bianchini | 192/93 A X |

FOREIGN PATENT DOCUMENTS

| 2315839 | 3/1973 | Fed. Rep. of Germany | 74/2 |
| 2241738 | 8/1972 | France | 251/66 |
| 850647 | 10/1960 | United Kingdom | 74/2 |

Primary Examiner—C. J. Husar
Assistant Examiner—Philip W. Thor
Attorney, Agent, or Firm—Werner W. Kleeman

[57] ABSTRACT

A release mechanism for opening a valve of a fire extinguishing installation by means of a linearly movable release element, such as a release plunger or release pin upon releasing a pre-stressed helical spring. At one end of the helical spring there is arranged a movable ball pressure plate. Between this ball pressure plate and a further fixedly arranged ball plate there are arranged balls or spherical elements. A loading pin provided at the movable ball pressure plate retains the helical spring under torsional stress and the movable ball pressure plate in such an angular position that the balls of both ball pressure plates can be retained at a starting distance. Upon electromagnetic release of the loading pin and return rotation of the helical spring the movable ball pressure plate rotates such that the spring can be axially relaxed or load-relieved and the release plunger or the like presses upon the release element of the valve and opens the latter. Concentrically arranged with respect to the helical spring is a further release element which can be manually actuated by a manually operated-release or actuator member, such as a release knob, independent of the electromagnetic release operation. The operating state of the release mechanism can be monitored visually and by microswitches.

8 Claims, 7 Drawing Figures

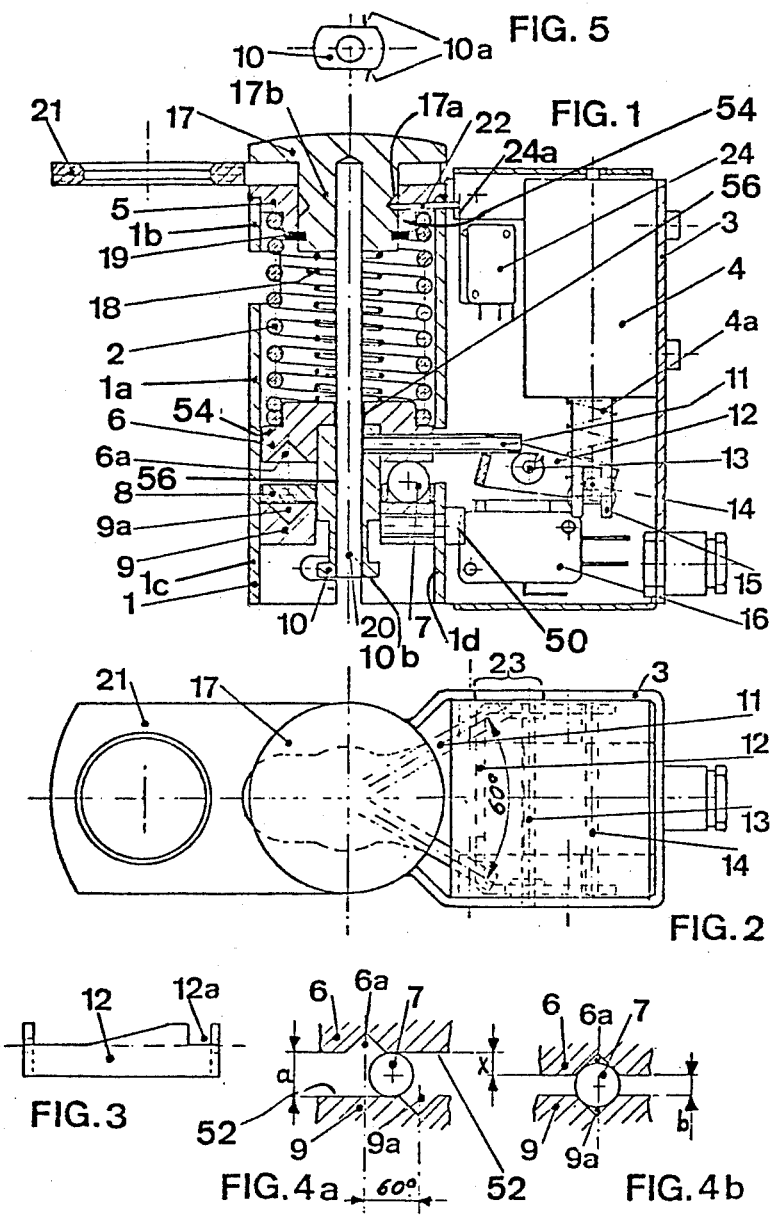

RELEASE MECHANISM FOR A VALVE OF A FIRE EXTINGUISHING INSTALLATION

BACKGROUND OF THE INVENTION

The present invention relates to a new and improved construction of a release mechanism for a valve of a fire extinguishing installation employing a linearly movable element which, upon release of a pre-stressed or biased spring, is moved out of a rest position and by virtue of its movement opens the valve.

Both in the case of fire extinguishing installations employing individual flasks or containers housing a suitable fire extinguishing medium or substance and arranged near the object to be protected, and equally, in the case of systems having a centrally arranged battery of flasks or containers housing the fire extinguishing substance, the individual flasks or containers or the like are retained closed by so-called flask valves, in order to prevent undesirable escape of the fire extinguishing medium or substance, for instance $CO_2$, halon (halogenated hydrocarbons), dry extinguishing powder, foam or water, into the pipe or conduit system. In the event of a fire the valves are opened manually or controlled by an automatic fire alarm system, and the infeed of the fire extinguishing substance is accomplished through the pipe system or the like to the outlet nozzles located at the site of the fire.

It is known to the art to employ control devices in order to open the valves and which contain a linearly movable element, typically for instance a plunger or a pin which, when released, presses against an appropriate part of the valve and thus causes opening of the valve. The control operation can be accomplished, by way of example, mechanically, pneumatically or electrically.

It is already known to employ a pre-stressed or biased spring in order to move the plunger. The spring is released, during the actuation or release operation, for instance electromagnetically. The energy stored in the spring is released and transmitted to the plunger. What is disadvantageous with this system is that the control function only can be carried out in one manner. In order to render possible other types of control functions there are required expensive and complicated auxiliary systems, often utilizing their own energy storages, which, in turn, are susceptible to disturbance and therefore must be additionally monitored.

A further drawback of heretofore known control techniques is that it is not possible, or only possible to a limited degree, to check the same as to their functional reliability. Also, in many control devices there are absent monitoring elements for supervising the requisite operating state and which are needed to obtain a faultless functionality of the fire extinguishing installations, for instance position switches which report to a central signal station the actuation or release of the valve.

In German petty Pat. No. 1,780,878 there is taught to the art a valve actuation device wherein the linear movement needed for actuating a valve is produced by the utilization of two ball pressure plates. These ball pressure plates are retained at a certain spacing relative to one another by balls. Further, these ball pressure plates can be turned relative to one another, whereby the balls can latch or cam into recesses or notches of the ball pressure plates, there thus being reduced the spacing between such plates, and consequently, there being accomplished actuation of the valve.

Similar equipment for translating a rotational movement into a linear movement has been disclosed in U.S. Pat. No. 2,943,496, granted July 5, 1960.

These prior art devices are however associated with the drawback that, while there is reduced the force needed for actuating the valve, nonetheless such force must be formed directly upon actuation of the valve. With the state-of-the-art release mechanisms this force is transmitted by means of an actuation knob or lever to the release mechanism. The elastic elements which are provided serve, to the extent that they are not components of the valve mechanism, only for retaining linearly movable release elements in their rest position. However, in the case of fire extinguishing devices the required expenditure of force has not been sufficiently reduced since, particularly in the case of an automatic release operation, the actuation of the valve must be accomplished with absolute certainty.

SUMMARY OF THE INVENTION

Therefore, with the foregoing in mind it is a primary object of the present invention to provide a release mechanism for a valve of a fire extinguishing installation which is not associated with the aforementioned drawbacks and limitations of the prior art proposals.

Another and more specific object of the invention is to avoid the aforementioned drawbacks of heretofore known release mechanisms or actuators for fire extinguishing valves, and particularly, to devise a release mechanism or actuator which can be released in a number of different ways, for instance mechanically or manually and by electrical control, without the need for expensive and complicated auxiliary systems.

In keeping with the immediately preceding objective it is a further object of the invention to maintain the energy needed for the release operation small, and wherein the release mechanism can be simply monitored as to its functional reliability and there can be equally supervised in a simple manner the operating state of such release mechanism.

Yet a further significant object of the present invention is to provide a new and improved construction of release mechanism or actuator for a valve of a fire extinguishing installation which is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the inventive release mechanism for a valve of a fire extinguishing installation contemplates a linearly movable element which, upon release of a pre-biased spring, moves out of its rest position and actuates the valve. Two ball pressure plates are provided between which there are arranged balls or spherical elements retaining the ball pressure plates in spaced relationship from one another and biasing or loading the spring. Upon rotation of the ball pressure plates relative to one another these balls latch or cam into notches or recesses of the ball pressure plates, and thus, are capable of at least partially load relieving the spring. The spring is a helical spring which, in its biased or stressed state, is loaded both in axial compression as well as in torsion. The movable ball pressure plate has a loading pin or element which, upon rotation of the movable ball pressure plate for biasing the helical spring, latches into an electromagnetically releasable release catch or equivalent structure.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a sectional view of a release mechanism or actuator constructed according to the invention;

FIG. 2 is a top plan view thereof;

FIG. 3 illustrates details of a release element, shown in the form of a release catch or pawl of the release mechanism of FIG. 1;

FIGS. 4a and 4b schematically show the ball pressure plates of the release mechanism in their loaded and unloaded conditions, respectively;

FIG. 5 illustrates a detail of the release securing element or safety of the release mechanism.

DETAILED DESCRIPTION OF THE PREFERRED EMBODIMENTS

Figure 6:
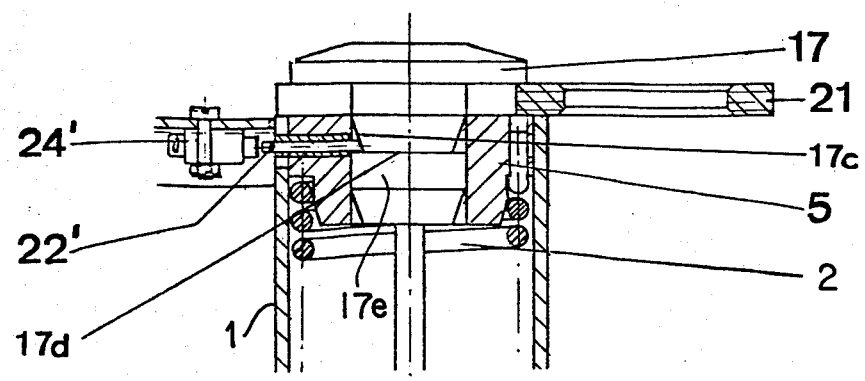
FIG. 6 illustrates in fragmentary sectional view details of an embodiment of a manually operated-release element, here shown in the form of a manually or hand operated-release knob.

Describing now the drawings, there is shown therein a release mechanism or actuator for a valve of a fire extinguishing installation or system, wherein to simplify the illustration of the drawings details of the fire extinguishing installation have not been shown since they can be assumed to be conventional, and further since they do not constitute subject matter of the invention are unimportant for understanding the underlying principles of this development. With the release mechanism or actuator shown by way of example in the drawings there is provided a housing 1 composed of an essentially tubular element 1a. Within the housing 1 there is arranged a suitable resilient element, here shown as a helical or coil spring 2, and release or actuator element, here shown as a plunger 10 as well as the secondary locking mechanism to be described. An auxiliary or supplementary housing 3 is laterally mounted at the housing 1. This auxiliary housing 3 contains a valve actuating device, here in the form of an electromagnet 4, constituting the primary locking device as well as microswitches 16 and 24 for monitoring the operating state.

The tubular-shaped housing 1 is closed at its upper end 1b by a guide flange 5 or equivalent structure. The other end 1c of the housing 1 is bounded by a lower ball pressure plate 9 which is fixedly connected in any suitable fashion, as by threaded bolts 50, with housing 1. The extension 1d of the housing 1 in downward direction serves for attaching the release mechanism or device, for instance, at a pneumatic control unit or directly at the flask valve to be actuated, in other words the valve associated with the flask or container housing the fire extinguishing medium or agent.

The helical spring 2 is mounted essentially concentrically within the housing 1. This helical spring 2 bears at its upper end against the guide flange 5 and at its lower end upon a movable, upper ball pressure plate 6. The upper ball pressure plate 6 can be moved in the direction of the lengthwise axis of the housing 1 and is rotatable about such axis. The release plunger 10 is mounted in such upper ball pressure plate 6. This ball pressure plate 6 bears upon three metallic balls or spherical elements 7, typically steel balls, which are held in position by a cage 8 or other suitable retaining element, both radially at a pitch circle and through an angle of 120° with respect to one another at such pitch circle. These steel balls 7 bear, in turn, upon the lower ball pressure plate 9 which is fixedly connected with the housing 1. Both the upper movable ball pressure plate 6 and equally the lower stationary or fixed ball pressure plate 9 each have three essentially identical notches or recesses 6a and 9a, respectively, and, specifically, in the same distribution or pitch and located at the same pitch circle as the pitch circle of the cage 8. When the steel balls 7 of both ball pressure plates 6 and 9 contact against flat parallel parts or surfaces 52 of the ball pressure plates 6 and 9, then the distance or spacing between both of these ball pressure plates 6 and 9 is essentially equal to the diameter a of the steel balls or spherical elements 7. In this condition the recesses 6a and 9a at the ball pressure plates 6 and 9 are not located opposite one another, rather displaced through an angle of about 60° with respect to one another and related to the pitch circle. In this condition the release mechanism or actuator is biased or loaded.

Upon rotation of the upper ball pressure plate 6 through an angle of about 60° in relation to the housing 1 and, more specifically, in relation to the lower ball pressure plate 9, the respective coacting recesses 6a and 9a are positioned essentially opposite one another. Consequently, the steel balls 7 roll over the contact surfaces 52 of the ball pressure plates 6 and 9 until they repose in the recesses 6a and 9a. As will be readily understood, there thus is reduced the spacing a (FIG. 4a) between the ball pressure plates 6 and 9 so as to assume a smaller spacing b (FIG. 4b). In this condition, the release mechanism is relaxed or relieved of load, and the stroke x corresponds to the distance or spacing change between both of the ball pressure plates 6 and 9. The release plunger 10 attached to the upper movable ball pressure plate 6 and provided with an extended loading element, such as a loading pin 11, which according to the exemplary embodiment under discussion can be a conventional dowel pin presses, in the relaxed state of the release mechanism, upon the release element to be actuated at the flask valve with the requisite force of, for instance, typically 100 to 150 N (10-15 kp.).

Upon loading or biasing the release or actuator mechanism it is necessary to move the upper movable ball pressure plate 6 both axially through the stroke x as well as also radially through an angle of about 60°. The helical spring 2 is fixed against rotation in any suitable manner, for instance by providing a respective appropriately turned or machined portion, generally indicated by reference character 54, at the guide flange 5 and at the ball pressure plate 6. During loading there is undertaken an axial rotation of the ball pressure plate 6 such that, as a result, the helical spring 2 has imparted thereto, apart from an axial biasing or loading stress, also a torsional stress in accordance with the rotation through 60°. This rotation is accomplished in a manner such that the helical spring 2 thus experiences a reduction in its diameter. This, in turn, again leads to an additional clamping of both spring ends at the machined portions 54 of the guide flange 5 and the ball pressure plate 6.

Accordingly, in the biased or loaded state of the release mechanism or actuator the upper ball pressure plate 6 must be retained both axially and also radially. As already described the axial support or retention is undertaken by the steel balls 7, whereas the radial support is accomplished by the loading element or pin 11. This loading pin 11 is retained in its loaded state by means of a suitable retaining element, here shown as a catch or pawl 12, which can rotate about a shaft or axle 13. This catch 12 has a notch 12a with which engages the loading element or pin 11. A second catch shaft or axle 14, rigidly secured at the catch 12, is operatively connected with a certain play with the electromagnet plunger or armature 15. This play eliminates the difference between the linear movement of the plunger or armature 15 and the arcuate movement of the catch shaft 14. An auxiliary spring 4a retains the plunger or armature 15, and thus, the catch 12 in its starting position.

Below the catch 12 there can be arranged one or more microswitches 16 or equivalent structure. Microswitch 16 is actuated as soon as the catch 12 is moved by the plunger or armature 15 of the electromagnet 4. Upon applying a potential to the electromagnet 4 the armature 15 upwardly lifts the catch shaft 14 and the catch 12 moves downwardly, with the result that the loading element or pin 11 is released out of the notch or recess 12a. Further, the upper ball pressure plate 6, under the action of the torsional stress of the helical spring 2, moves into its end position. The steel balls 7 roll over the surfaces 52 of both ball pressure plates 6 and 9 and as soon as the recesses or notches 6a and 9a of the ball pressure plates 6 and 9 are located opposite one another, then the steel balls 7 latch or cam into such recesses 6a and 9a, with the result that the spacing between both ball pressure plates 6 and 9 is reduced from the starting value or distance a to the end value or distance b.

Apart from this electrical release operation there is contemplated a completely independently functioning manual release operation. The manual release mechanism responsible for the manual release operation comprises a substantially mushroom-shaped, manually operated release element, here shown in the form of a manually operated-release knob 17 which is mounted to be axially movable in the guide flange 5, and as best seen by referring to FIGS. 1 and 6. Between the manually operated-release knob 17 and the upper ball pressure plate 6 there is arranged an auxiliary spring 18 essentially concentrically with respect to the helical spring 2. A Seeger or circlip lock ring 19 or equivalent structure forms an upper stop for the manually operated-release knob 17 at the guide flange 5. Pressed or otherwise provided at such manually operated-release knob 17 is a release or actuator pin 20 which extends with a certain play through appropriately configured bores 56 provided at the movable ball pressure plate 6 and the release plunger 10. This linearly movable release element or pin 20 terminates at the same height as the lower side or face 10b of the release plunger 10. By depressing the manually operated-release knob 17 this release pin 20 is directly pressed against the release element or the like of the valve which is to be operated, so that such can be manually opened completely independent of the electromagnetic release operation. Between the essentially mushroom-shaped manually operated-release knob 17 and the guide flange 5 there is inserted a securing or safety element 21 having essentially the same thickness as the required release stroke x. The manual release of the release mechanism therefore only can be accomplished if previously there has been removed the securing or safety element 21.

During the assembly of the release mechanism, for instance at the pneumatic control unit or directly at the valve, a securing or safety element ensures that it is not possible to carry out the assembly work in the unloaded state of the release mechanism, and thus, there is beneficially avoided that, during assembly of the release mechanism and the control device or the release mechanism and the valve, the valve will be unintentionally actuated. This safety element or device is constituted by the provision of two milled or otherwise suitably machined surfaces 10a provided at the lower circular cross-sectional region of the release plunger 10, as best seen by referring to FIG. 5. Equally, the housing 1 is positioned at the control unit of the valve or at the valve itself by means of a not particularly shown dowel pin provided at the control unit or valve, as the case may be. The milled or machined surfaces 10a at the release plunger 10, depending upon the operating state of the release mechanism are turned through about 60° so that only in the loaded or stressed state, in other words when the release plunger 10 is in its upper position, are these surfaces 10a parallel to side surfaces of a slot in the control unit or in the valve attachment flange and the mentioned dowel pin and a centering hole at the release mechanism then are situated opposite one another for interengagement. Only in this position is it possible to mount the apparatus without the control piston of the control unit being depressed or the valve actuated.

In order to monitor the release mechanism such can be detached by simple means from the control device or the valve. Upon applying a potential or after activating the fire alarm system, with which there is connected the fire extinguishing installation, it is possible to monitor the operation of the release mechanism, without there existing the danger that the flask valve will be actuated and thus opened. The loading or biasing of the release mechanism can be accomplished with a special tool or the like, which engages with both of the milled or machined surfaces 10a of the plunger 10. By means of this tool the release plunger 10 and thus the upper ball pressure plate 6 are turned back into their starting position. The steel balls 7 roll over the surfaces of the recesses 6a and 9a onto the flat surfaces 52 of the ball pressure plates 6 and 9, and thus load the helical spring 2 until assuming their starting position. During the rotation of the ball pressure plate 6, the loading pin 11 which is rocked along therewith latches into the notch 12a of the catch 12 which, in turn, is pressed by the auxiliary spring 4a of the electromagnet 4 against the loading pin 11.

In order to monitor the operating state of the apparatus there can be provided a number of monitoring or supervising switches. First of all there is provided below the catch 12 the already mentioned microswitch 16 which is switched when the catch 12 is rocked into its lower position. This is then the case when the electromagnet 4 has been energized and the ball pressure plate 6 rotated and latched into its lower position, i.e., when the release mechanism is in its relaxed or unloaded state. The microswitch 16, located below the catch 12, has a number of functions. On the one hand, it serves to report to a central signal station that the valve has been activated, and, on the other hand, serves to interrupt the flow of current through the electromagnetic valve after the control operation has been completed.

Adjacent the manually operated-release knob 17 there can be provided a further microswitch 24 which can be operated by a bevelled machined surface or portion 17a provided at the shaft 17b of the manually operated-release knob 17 and a pin 22 seated upon such surface 17a. The pin 22 is movably arranged in essentially horizontal position in the guide flange 5. The movement of the pin 22 is transmitted to a switching tab 24a or the like of the microswitch 24.

FIG. 6 shows a longitudinal sectional view through the upper part of the release mechanism. With this preferred embodiment the manually operated-release knob 17 is secured against being pulled out of the housing 1 by pin 22' which coacts with the ring-shaped surface 17d of a substantially cylindrical portion 17e of the knob 17. Pin 22' is arranged to be horizontally movable at the guide flange 5 and simultaneously serves to actuate the microswitch 24'. The pin 22' bears at a conically formed surface or part 17c of the manually operated-release knob 17 such that by means of the substantially ring-shaped surface 17d, of the cylindrical knob portion 17e arranged essentially larallel to the axis of the pin 22', and at which surface, as mentioned, there bears the pin in its rest state, there is prevented retraction or pulling out of the actuation knob 17 from the housing 1 in upward direction of FIG. 6, and upon actuation of the manually operated-release or actuation knob 17, downwardly in the showing of FIG. 6, the conical surface 17c outwardly shifts the pin 22' while actuating the microswitch 24. With this embodiment there are not needed the Seeger ring 19 and auxiliary spring 18.

An additional mechanical-optical operating state indication of the release mechanism can be achieved in that the loading pin 11, in the relaxed state of the release mechanism, is visible through a slot 23 provided at the wall of the housing 3.

The inventive release mechanism affords the considerable advantage that for the release operation there is only required the force which is needed in order to rotate the catch 12 to such an extent that the loading pin 11 can slide out of its rest position, i.e, it must only overcome the low frictional resistance brought about by the torsional stress of the helical spring 2 in the notch 12a of the catch 12.

The operating state of the valve which is controlled by the inventive release mechanism can be determined at any point in time. The remote release operation can be reported by means of the microswitch 16 and additionally by the microswitch 24 to the central signal station. The manual release operation is reported by the microswitch 24 to the central signal station. If the signals are conducted separately from the microswitches 16 and 24, it is possible to immediately recognize whether there has been accomplished an automatic remote release operation or a manual release operation. Additionally, the manual release operation can be detected directly at the site by virtue of the position of the manually operated-release knob 17 or equivalent structure.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A release mechanism for a valve of a fire extinguishing installation having a linearly movable element which, upon release of a pre-biased spring, moves out of a rest position and actuates the valve, comprising:
   two cooperating mutually spaced ball pressure plates;
   a spring defining said pre-biased spring cooperating with said ball pressure plates;
   a plurality of balls arranged between said ball pressure plates for maintaining said ball pressure plates in spaced relationship from one another and for biasing said spring;
   each of said ball pressure plates have recesses for receiving said balls;
   said ball pressure plates being rotatable relative to one another so that said balls latch into said recesses of the ball pressure plates and enable the spring to at least partially relax;
   said spring comprising a helical spring which in its biased state is loaded both in axial compression and in torsion;
   one of said ball pressure plates defining a movable ball pressure plate;
   a loading pin connected with said movable ball pressure plate;
   an electromagnetically actuatable release catch means cooperating with said loading pin; and
   said loading pin, upon rotation of said movable ball pressure plate, latching at said electromagnetically actuatable release catch means in order to load said helical spring.

2. The release mechanism as defined in claim 1, further including:
   housing means within which there are arranged said helical spring and said ball pressure plates;
   a guide flange connected with said housing means;
   said helical spring having opposed ends;
   one of the opposed ends of said helical spring being clamped at said guide flange and the other opposed end of said helical spring at part of said movable ball pressure plate; and
   said helical spring, due to its loading stress, reducing its internal diameter.

3. The release mechanism as defined in claim 1, further including:
   an auxiliary spring arranged essentially concentrically with respect to said helical spring;
   a manually operated-release element operatively connected with said auxiliary spring;
   a first linearly movable element cooperating with said movable ball pressure plate;
   a second linearly movable element operating independently of said first linear movable element; and
   said manually operated-release element cooperating with said second linearly movable element for the independent manual release of the valve.

4. The release mechanism as defined in claim 3, wherein:
   said manually operated-release element comprises a manually operated release knob.

5. The release mechanism as defined in claim 4, further including:
   securing means for blocking said manually operated-release knob.

6. The release mechanism as defined in claim 1, further including:
   at least one microswitch for monitoring the operating state of the release mechanism.

7. The release mechanism as defined in claim 1, further including:
   auxiliary housing means;

electromagnetic means for operating said release catch means arranged in said auxiliary housing means;

said auxiliary housing means including slot means for providing visual access to said loading pin in order to visually determine the operating state of the release mechanism.

8. The release mechanism as defined in claim 5, further including:

pin means for securing said manually operated-release knob;

housing means within which there is arranged said helical spring and said ball pressure plates;

a guide flange for closing an end of said housing means;

said pin means being arranged essentially horizontally for radial movement at said guide flange and simultaneously serving for actuating a microswitch;

a microswitch actuated by said pin means;

said manually operated-release knob having an essentially conically formed part against which bears said pin means such that by means of a lower substantially ring-shaped surface arranged essentially parallel to the lengthwise axis of said pin means and against which bears said pin means in a rest position thereof there is prevented pulling out of said manually operated-release knob; and upon actuation of said manually operated-release knob said conical surface outwardly displaces said pin means while actuating said microswitch.

* * * * *